Patented Dec. 1, 1953

2,661,268

UNITED STATES PATENT OFFICE 2,661,268

PRODUCTION OF HYDROGEN PEROXIDE

Kenneth W. MacFadyen, Avenel, and Ned E. Jaffa, Roselle, N. J., assignors to Food Machinery and Chemical Corporation, Wilmington, Del., a corporation of Delaware No Drawing. Application May 7, 1946, Serial No. 668,011

9 Claims. (Cl. 23—207)

This invention relates to an improved process for the production of hydrogen peroxide by the reaction of barium peroxide, carbon dioxide, and water.

A number of prior experimentors have produced hydrogen peroxide by reacting these same compounds under various combinations of pressure and temperature following various procedures, and one of them has suggested the use of hydrochloric acid and other additives to assist the reaction and to improve the yields. These prior procedures, however, are incapable of producing uncontaminated hydrogen peroxide solution both high in yield and high in concentration, which fact is generally admitted in the descriptions of such processes appearing in the literature and has now been confirmed by experimentation. One of these prior practices, for example, is stated to have led in successive operations to a 90 per cent yield of hydrogen peroxide in a solution of 4 per cent strength and to a 75 per cent yield at a concentration of 6 per cent, showing inability to obtain high yields of the more highly concentrated products.

An object of the present invention is to provide a commercially successful process of producing hydrogen peroxide in high yields and in higher concentrations than heretofore obtainable by the above-described general process.

A further object is to provide hydrogen peroxide and barium carbonate, the latter as a by-product, of sufficient purity for commercial acceptance.

Firstly, the present invention involves reacting barium peroxide, carbon dioxide, and water in the presence of a small amount of an acid of phosphorus. Through this procedure improved yields of hydrogen peroxide of higher concentration are obtained under most any procedure and under most any combination of conditions suggested in the prior art.

Secondly, the invention involves reacting the above-mentioned compounds including the acid of phosphorus under certain carefully controlled conditions in a certain way. Using this novel combination of conditions (temperature and pressure) with the particular procedure, about 94% actual yields of hydrogen peroxide as high as 32 volume (about 10 per cent strength) can be obtained in the reaction mass either directly or by recycling hydrogen peroxide solution and using the same instead of water. By recycling hydrogen peroxide 42 volume (12%) can be produced at about 89% actual yield.

Thirdly and in a more limited embodiment, the invention involves a procedure and control of conditions for producing hydrogen peroxide in high yields in higher concentrations under economically favorable conditions in conventional equipment, i. e., an autoclave provided with an inert lining as stainless steel with a stirring means, a simple cooling coil, and a cooling jacket. Such apparatus permits the regulation of the temperature throughout the reaction mass at an optimum level by withdrawing heat through the walls by indirect heat transfer coupled with efficient agitation, and it provides little or no obstruction to the viscous slurry which has a tendency to settle out where vigorous movement is not maintained.

Accordingly, the present process may be broadly defined as comprising reacting barium peroxide, carbon dioxide, and water in the presence of a small quantity of an acid of phosphorus under superatmospheric pressure and reduced temperature conditions until hydrogen peroxide is obtained. Only a small amount of the phosphorus compound is required. An amount equivalent to 0.5 per cent phosphorus pentoxide (based on the weight of the barium carbonate to be formed) usually is adequate. Under certain conditions, slightly larger amounts may be required but amounts more than 1 per cent are sometimes detrimental to yields. Amounts as low as 0.10 per cent have led to yields of 92 per cent of relatively highly concentrated hydrogen peroxide. The optimum amount to be employed in any specific operation can easily be determined.

The whole action of phosphorus pentoxide or other phosphorus compound in increasing the yields of the relatively highly concentrated hydrogen peroxide has not been determined, but whatever it is, it includes something else besides its power to stabilize the hydrogen peroxide formed, because, in the absence of the phosphorus compound, an excellent hydrogen peroxide stabilizer like acetanilide does not give the high yields and strengths obtained with phosphoric acid. The action may involve the stabilization of the suspension of barium peroxide in water, or the removal by precipitation in the form of insoluble phosphates harmful impurities which cause hydrogen peroxide decomposition during the reaction, or the participation in the reaction mechanism by intermediate compound formation, or the catalytic action in facilitating the reaction.

For obtaining very high or almost quantitative yields of more highly concentrated hydrogen peroxide, the present process involves introducing an aqueous slurry of barium peroxide into an aqueous solution of carbon dioxide under superatmospheric pressure of carbon dioxide during cooling sufficient to maintain the temperature below that at which the hydrogen peroxide produced decomposes, the said reaction mass containing a small quantity of the acid of phosphorus. Specifically, the operation may be and preferably is carried out by introducing into a jacketed autoclave having a stirring means therein an aqueous solution of the acid of phosphorus in an amount of water calculated, when added to the amount later introduced with the barium peroxide, to produce the desired concentration of hydrogen peroxide, next cooling the water to a low temperature, introducing carbon dioxide during cooling until the desired superatmospheric pressure is attained, and continuously or continually introducing barium peroxide in the form of an aqueous slurry into the aqueous carbon dioxide solution at a rate correlated with the cooling efficiency of the apparatus to permit retention of the temperature sufficiently low to avoid decomposition of the hydrogen peroxide product formed. Upon completion of the reaction, the pressure is released, and the hydrogen peroxide and barium carbonate mixture are withdrawn, filtered and purified.

The following example is illustrative of the invention and is operated to accomplish the production of 23.5 volume hydrogen peroxide at approximately 94 per cent actual yield after filtration and washing in converting the barium peroxide to hydrogen peroxide. An autoclave provided with an efficient stirring means and a jacket is charged with 4460 parts of water containing from 0.5 to 1.0 per cent of phosphoric acid (estimated as $P_2O_5$ and based on the barium carbonate to be formed). Brine, at a temperature suitably of about $-10°$ C., is circulated through the jacket until the temperature of the water-phosphoric acid solution is reduced to a temperature which may be anywhere between $2°$ and $17°$ C. Next, the carbon dioxide is introduced into the solution until the pressure in the autoclave rises to an amount between about 170 to 300 p. s. i. Thereupon, a slurry of 5240 parts of 88 per cent barium peroxide with 6000 parts of water is prepared and is introduced into the autoclave during constant stirring in 10 equal portions, each being followed by the introduction of 150 parts of water, the introduction being effected in such manner as to prevent the temperature from rising to a figure over about $20°$ C. The introduction of the "shots" into the autoclave may be accomplished with the aid of nitrogen under pressure in a feed vessel connected to the autoclave or by the use of a suitable pump. In view of the settling characteristics of the slurry, 150 parts of water may be run through the feed vessel to clear the same and then be forced into the autoclave. The introduction of the barium peroxide slurry is effected over the period of from 0.5 to 1.5 hours.

The above-disclosed process may be operated to produce hydrogen peroxide of higher concentrations simply by reducing the amount of water introduced into the autoclave. Higher concentrations of hydrogen peroxide may also be obtained in the above process by employing instead of water a weak solution of hydrogen peroxide, which solution may be that obtained by washing with water the barium carbonate precipitate obtained as a by-product. Suitably, 10 volume hydrogen peroxide amounting to 15 per cent or more of the total theoretical hydrogen peroxide producible may be recirculated.

Upon completion of the reaction in the autoclave, the pressure is released and the reaction mass is stirred for about an hour, with or without aeration, to remove $CO_2$ and reduce the soluble barium by converting the barium bicarbonate in solution to barium carbonate which precipitates out. The slurry is then subjected to filtration to separate the hydrogen peroxide solution from the barium carbonate. The stirring treatment is of particular value in considerably reducing the agents required for the finishing or purifying operations. Thereupon, the hydrogen peroxide produced may be treated with sulfuric acid, clarified by filtration and standardized in known manner to produce the purified hydrogen peroxide product. The barium carbonate by-product is obtained in almost quantitative yields, the principal impurities therein being about 1 per cent barium sulfate and about 1.5 per cent barium acid phosphate. It may be purified by boiling with soda ash solution in known manner thereby to remove 85 per cent of the barium sulfate and 40 per cent of the phosphorus pentoxide content, the said product then being in a form sufficiently pure for acceptance in a larger number of commercial uses.

Alternatively, the hydrogen peroxide may be purified in a two-step treatment, the first involving reaction with barium hydrate and the second with sulfuric acid.

The hydrogen peroxide product formed after being treated in conventional manner for stabilization and adjustment of its concentration will pass all tests required by the United States Pharmacopoeia.

Although the time of addition in the hereinbefore-described example may be varied to some extent in the particular autoclave employed without adversely affecting the results, control of the temperature could not easily be accomplished therein when the time was reduced to periods of less than one-half hour. An extension of the time of addition beyond 1.5 hours in some instances leads to a decrease in yields. If a satisfactory autoclave having more efficient cooling means were available, the time of the addition could be shortened to some extent without reducing yields.

With reference to the pressure in the said process, amounts less than about 160 p. s. i. ordinarily lead to lower yields of hydrogen peroxide and where the pressure employed is only about 125 p. s. i., the actual yields fall off to about 89 per cent.

With reference to the temperature in the hereinbefore-described process, reduced yields are ordinarily obtained if the average temperature is permitted to rise, for any appreciable period, to a point above about $20°$ C. At an average of about $23°$ C., with variations up to about $26°$ C., the yields may be as low as 84 per cent, due mainly to poor $BaO_2$ conversion efficiency.

In accordance with a specific embodiment of the invention, the process as hereinbefore described is altered to the extent that a small amount of a hydrogen peroxide stabilizer is added to the makeup, about 0.2% (based on a 25 volume hydrogen peroxide product) usually being sufficient. Known stabilizers have been found to increase the actual yield from 94.5% to as high as 98%. Examples of stabilizers which may be used are diphenyl guanidine, acetanilide and sodium biphthalate, all of which are organic stabilizers.

The present process has several advantages over prior known processes. For example, the present commercial method most commonly employed for the production of hydrogen peroxide from barium peroxide produces blanc fixe as a by-product, which product is sometimes overproduced to satisfy commercial needs whereas the present process provides barium carbonate for which there is a more ready market. As compared with prior processes involving the production of hydrogen peroxide from barium peroxide and carbon dioxide, the present process has the advantage of producing substantially greater yields of hydrogen peroxide of higher concentration, which means less equipment to obtain the same amount of hydrogen peroxide, or more hydrogen peroxide from the same amount of equipment. The process is capable of producing 23 to 44 volume hydrogen peroxide at from about 95 to 89%, respectively, actual yield. As compared with the hereinbefore-mentioned prior process involving an addition of hydrochloric acid, the present process does not produce hydrogen peroxide contaminated with acid or with chloride, which contamination would limit its sales utilization to commercial-grade operations. The present process has the additional advantage that it does not require that the temperature be maintained at the less economic or uneconomic low levels of 5° or 6° C. or lower called for in a number of prior related processes, for temperatures of from 10° to 20° C. may be used with equally good success.

In the production of hydrogen peroxide by the related processes of the prior art not employing the addition of an acid of phosphorus, the peroxide solution obtained, in many instances, is yellow in color, requiring special purification methods which result in a reduction in ultimate yield of hydrogen peroxide. The present process wherein an acid of phosphorus is employed has the advantage that this yellow color and prior treatment required to remove the same is ordinarily completely avoided.

Although phosphoric acid (the ortho compound) is preferred in the process of the present invention, other acids of phosphorus and as well, salts and other compounds supplying such acids may be employed, with varying degrees of success. Metaphosphoric acid, trisodium phosphate and orthophosphorous acid give results as good or nearly as good as orthophosphoric acid, while tetrasodium pyrophosphate, sodium tripolyphosphate and dibarium phosphate are effective to a lesser degree. In the appended claims where an acid of phosphorus is specified, it should be understood that such terminology includes the salts and other compounds which provide ions of such acids under the conditions of the reaction.

It should be understood that the present invention is not limited to the specific materials and procedures hereindisclosed but that it contemplates all variations within the scope of the terms of the claims appended hereto.

We claim:

1. In the production of hydrogen peroxide by the reaction of barium peroxide, carbon dioxide, and water under superatmospheric pressure during cooling, the improvement whereby hydrogen peroxide is produced in yields of at least 89 per cent comprising effecting said reaction under a carbon dioxide pressure of at least 125 p. s. i. in the presence of an acid of phosphorus in an amount equivalent to at least 0.10 per cent $P_2O_5$.

2. The process of producing hydrogen peroxide of at least 23 volume strength in yields of at least 89 per cent which comprises reacting barium peroxide, carbon dioxide, and water in the presence of an acid of phosphorus in an amount equivalent to at least 0.10 per cent $P_2O_5$ and under a carbon dioxide pressure of at least about 125 p. s. i. at a temperature below about 26° C.

3. The process of producing hydrogen peroxide in yields of at least 89 per cent which comprises reacting barium peroxide, carbon dioxide, and water in the presence of a small quantity of an acid of phosphorus in an amount equivalent to at least 0.10 per cent $P_2O_5$ and carbon dioxide under a pressure of at least about 160 p. s. i. and a temperature below about 26° C. and averaging within the range of about 10–20° C.

4. The process of producing a substantially acid-free hydrogen peroxide of at least 23 volume strength in yields of at least 89 per cent which comprises introducing an aqueous slurry of barium peroxide into an aqueous solution of carbon dioxide under a superatmospheric pressure of carbon dioxide of at least 125 p. s. i. during cooling which maintains the temperature below that at which hydrogen peroxide decomposes, said reaction being carried out in the presence of an acid of phosphorus in an amount equivalent to at least 0.10 per cent $P_2O_5$.

5. The process of producing hydrogen peroxide in yields of at least 89 per cent which comprises introducing an aqueous slurry of barium peroxide into an aqueous solution of carbon dioxide containing a small amount of a hydrogen peroxide stabilizer and an acid of phosphorus in an amount equivalent to at least 0.10 per cent $P_2O_5$, said solution and resulting reaction mass being maintained under a superatmospheric carbon dioxide pressure of at least 125 p. s. i. and at a temperature below about 26° C.

6. The process of producing hydrogen peroxide of at least 23 volume strength in yields of at least 89 per cent which comprises introducing an aqueous slurry of barium peroxide into an aqueous solution of carbon dioxide under a pressure of carbon dioxide of at least about 125 p. s. i. and reacting the said compounds in the presence of phosphoric acid in an amount equivalent to at least 0.10 per cent $P_2O_5$ while agitating and maintaining the mass at a temperature below about 26° C. and averaging within the range of about 10–20° C.

7. A process for producing hydrogen peroxide of at least 23 volume strength in yields of at least 89 per cent which comprises, introducing an aqueous slurry of barium peroxide into a cold aqueous solution of carbon dioxide containing an acid of phosphorus in an amount equivalent to at least 0.10 per cent $P_2O_5$, at a pressure above about 160 p. s. i. during agitation and cooling, said introduction being at a rate which causes the temperature of the reaction mass to average below about 20° C. and not to exceed about 26° C. for any appreciable period of the reaction.

8. A process for producing hydrogen peroxide of at least 23 volume strength in yields of at least 89 per cent which comprises, introducing an aqueous slurry of barium peroxide into a cold aqueous solution of carbon dioxide containing orthophosphoric acid in an amount equivalent to at least 0.10 per cent $P_2O_5$, at a pressure above about 160 p. s. i. during agitation and cooling, said introduction being at a rate which causes the temperature of the reaction mass to average below about 20° C. and not to exceed about 26° C. for any appreciable period of the reaction.

9. A process for economically producing hydrogen peroxide in yields of at least 89 per cent from barium peroxide, carbon dioxide, and water which comprises, introducing over a period of about 0.5 to 1.5 hours an aqueous slurry of barium peroxide into a cold aqueous body of carbon dioxide solution containing an amount of orthophosphoric acid equivalent to from 0.1 to 1.0 per cent $P_2O_5$, at a pressure above 160 p. s. i., during agitation and during cooling by indirect transfer of heat to a surrounding colder fluid, the temperature of the reaction mass being maintained at an average around 20° C. and not permitted to exceed 26° C. for any appreciable period of the reaction.

KENNETH W. MACFADYEN.
NED E. JAFFA.

References Cited in the file of this patent

UNITED STATES PATENTS

| Number | Name | Date |
|---|---|---|
| 440,792 | Erwin | Nov. 18, 1890 |
| 632,096 | Bruckman | Aug. 29, 1899 |
| 870,148 | Wolffenstein | Nov. 5, 1907 |
| 1,000,298 | Larson | Aug. 8, 1911 |
| 1,052,626 | Stoll | Feb. 11, 1913 |
| 1,076,039 | Jacobs | Oct. 21, 1913 |
| 1,235,664 | Doerner | Aug. 7, 1917 |
| 1,754,163 | Draisbach | Apr. 8, 1930 |
| 1,978,551 | Rentschler | Oct. 30, 1934 |
| 2,027,838 | Reichert | Jan. 14, 1936 |
| 2,153,658 | Budowski | Apr. 11, 1939 |
| 2,259,479 | Morgan | Oct. 21, 1941 |

FOREIGN PATENTS

| Number | Country | Date |
|---|---|---|
| 3,628 of 1890 | Great Britain | Feb. 14, 1891 |
| 10,476 of 1891 | Great Britain | June 19, 1891 |
| 13,828 of 1906 | Great Britain | June 15, 1907 |
| 23,676 of 1908 | Great Britain | Dec. 6, 1909 |
| 294,265 | Great Britain | Oct. 18, 1928 |
| 435,401 | Great Britain | Sept. 17, 1935 |